United States Patent
Gaddam et al.

(10) Patent No.: US 12,034,371 B1
(45) Date of Patent: Jul. 9, 2024

(54) VOLTAGE REGULATORS WITH CLOCK GENERATORS FOR MULTI-PHASE CONVERTERS

(71) Applicant: Empower Semiconductor, Inc., Milpitas, CA (US)

(72) Inventors: Narendra Nath Gaddam, Milpitas, CA (US); Shrinivasan Jaganathan, San Jose, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 0 days.

(21) Appl. No.: 17/447,793

(22) Filed: Sep. 15, 2021

Related U.S. Application Data (60) Provisional application No. 63/079,010, filed on Sep. 16, 2020.

(51) Int. Cl.
*H02M 3/158* (2006.01)
*G05F 1/10* (2006.01)

(52) U.S. Cl.
CPC ............ *H02M 3/1584* (2013.01); *G05F 1/10* (2013.01)

(58) Field of Classification Search
CPC ........ H02M 1/0041; H02M 3/02; H02M 3/04; H02M 3/10; H02M 3/156; H02M 3/1563; H02M 3/157; H02M 3/158; H02M 3/1584; H02M 3/1586; H02M 3/335; H02M 3/33507; H02M 3/33515
See application file for complete search history.

(56) References Cited

U.S. PATENT DOCUMENTS

| | | | | |
|---|---|---|---|---|
| 6,222,745 B1* | 4/2001 | Amaro | ............... | H02M 3/157 363/71 |
| 7,812,581 B2* | 10/2010 | Qiu | ............... | H02M 3/1584 323/272 |
| 7,898,233 B2* | 3/2011 | Sato | ............... | H02M 3/1584 323/283 |
| 2009/0128207 A1* | 5/2009 | Chang | ............... | H03K 5/1565 327/175 |
| 2013/0293203 A1* | 11/2013 | Chen | ............... | H02M 3/1584 323/234 |
| 2015/0280560 A1* | 10/2015 | Guo | ............... | H02M 3/1584 323/271 |
| 2017/0229961 A1* | 8/2017 | Zhang | ............... | H02M 3/1584 |
| 2018/0191333 A1* | 7/2018 | Chen | ............... | H02M 3/156 |
| 2019/0385652 A1* | 12/2019 | Yoshida | ............... | G06F 1/04 |
| 2020/0366203 A1* | 11/2020 | Mei | ............... | H02M 3/33507 |
| 2020/0412233 A1* | 12/2020 | Shen | ............... | H02M 3/1584 |

* cited by examiner

*Primary Examiner* — Thienvu V Tran
*Assistant Examiner* — Shahzeb K Ahmad
(74) *Attorney, Agent, or Firm* — Fisher Broyles, LLP (57) ABSTRACT

A multiphase switching voltage regulator is disclosed. The regulator includes a first clock generator circuit configured to receive a reference clock, and to generate M first clocks, where the M first clocks are phase separated by 360°/M, a plurality of phase extrapolator circuits, where the plurality of phase extrapolator circuits includes N phase extrapolator circuits, and a phase selector multiplexer configured to provide one of the M first clocks to each of the phase extrapolator circuits, where the N phase extrapolator circuits are configured to generate N output clocks, where the N output clocks are phase separated by 360°/N.

21 Claims, 4 Drawing Sheets

VOLTAGE REGULATORS WITH CLOCK GENERATORS FOR MULTI-PHASE CONVERTERS

RELATED APPLICATION

This application claims the benefit of U.S. Provisional Patent Application No. 63/079,010, titled "CLOCK GENERATION FOR MULTI-PHASE CONVERTERS," filed Sep. 16, 2020, which is hereby incorporated in its entirety and for all purposes.

FIELD OF THE INVENTION

The present application generally relates to systems and methods for generating multiphase clocks, and more particularly to systems and methods for generating multiphase clocks for voltage generator circuits.

BACKGROUND OF THE INVENTION

Some circuits use multiple clocks having the same frequency, where the multiple clocks are offset by a constant phase difference. For example, switching voltage regulator circuits frequently use multiple multiphase clocks. The performance of the circuits using the multiphase clocks may depend on the accuracy and constancy of the phase difference among the multiphase clocks. Improvements in controlling the phase difference among multiphase clocks is needed in the art.

BRIEF SUMMARY OF THE INVENTION

One embodiment is a multiphase switching voltage regulator circuit that includes a first clock generator circuit configured to receive a reference clock and generates M first clocks. The M first clocks are phase separated by 360°/M. The circuit includes N phase extrapolator circuits, and a phase selector multiplexer configured to provide one of the M first clocks to each of the phase extrapolator circuits. The N phase extrapolator circuits are configured to generate N output clocks, where the N output clocks are phase separated by 360°/N.

One inventive aspect is a voltage regulator. The voltage regulator includes a first clock generator circuit configured to receive a reference clock signal, and to generate M first clock signals, where each of the M first clock signals are phase separated by 360°/M, N phase extrapolator circuits, where N is not equal to M. The voltage regulator also includes a phase selector multiplexer configured to provide one of the M first clock signals to each of the N phase extrapolator circuits, where the N phase extrapolator circuits are configured to generate N output clock signals based in part on the M first clock signals received from the phase selector multiplexer, where each of the N output clock signals are phase separated by 360°/N.

In some embodiments, each phase extrapolator circuit of the N phase extrapolator circuits is configured to receive a particular one of the M first clock signals, and to generate a corresponding one of the N output clock signals, where the particular one of the N output clock signals has a phase difference relative to the received particular one first clock signal, and where the phase differences of the N output clock signals are controlled so that the N output clock signals are phase separated by 360°/N.

In some embodiments, the voltage regulator also includes a phase extrapolator controller configured to change N.

In some embodiments, each of the N phase extrapolator circuits include a ramp generator circuit configured to receive one of the M first clock signals and to generate a ramp signal in response to the received first clock signal, and a comparator circuit configured to compare the ramp signal to a programmable reference and to generate one of the N output clock signals based on the comparison, and the generated one output clock signal has a phase difference with respect to a phase of the received first clock signal which is dependent on a value of the programmable reference.

In some embodiments, the ramp signal changes monotonically, the programmable reference has a minimum value and has a maximum value, and a time difference between the ramp signal having a value corresponding with the programmable reference having a minimum value and the ramp signal having a value corresponding with the programmable reference having a maximum value is calibrated.

In some embodiments, the reference clock has a period, and the time difference is about equal to about 14 of the period of the reference clock.

In some embodiments, the voltage regulator the ramp signal changes monotonically with a rate of change determined by a calibration signal.

In some embodiments, the calibration signal is determined by a calibration controller, and where the voltage regulator is physically disconnectable from the calibration controller.

Another inventive aspect is a voltage regulator. The voltage regulator includes a first clock generator circuit configured to receive a reference clock signal, and to generate M first clock signals, where each of the M first clock signals are phase separated by 360°/M, N phase extrapolator circuits. The voltage regulator also includes a phase selector multiplexer configured to provide one of the M first clock signals to each of the N phase extrapolator circuits, where the N phase extrapolator circuits are configured to generate N output clock signals based in part on the M first clock signals received from the phase selector multiplexer, and where each of the N output clock signals are phase separated by 360°/N.

In some embodiments, each phase extrapolator circuit of the N phase extrapolator circuits is configured to receive a particular one of the M first clock signals, and to generate a corresponding one of the N output clock signals, where the particular one of the N output clock signals has a phase difference relative to the received particular one first clock signal, and where the phase differences of the N output clock signals are controlled so that the N output clock signals are phase separated by 360°/N.

In some embodiments, the voltage regulator also includes a phase extrapolator controller configured to change N.

In some embodiments, each of the N phase extrapolator circuits include a ramp generator circuit configured to receive one of the M first clock signals and to generate a ramp signal in response to the received first clock signal, and a comparator circuit configured to compare the ramp signal to a programmable reference and to generate one of the N output clock signals based on the comparison, where the generated one output clock signal has a phase difference with respect to a phase of the received first clock signal which is dependent on a value of the programmable reference.

In some embodiments, the ramp signal changes monotonically, where the programmable reference has a minimum value and has a maximum value, and where a time difference between the ramp signal having a value corresponding with the programmable reference having a minimum value and the ramp signal having a value corresponding with the programmable reference having a maximum value is calibrated.

In some embodiments, the reference clock has a period, and where the time difference is about equal to about 14 of the period of the reference clock.

In some embodiments, the ramp signal changes monotonically with a rate of change determined by a calibration signal.

In some embodiments, the calibration signal is determined by a calibration controller, and where the voltage regulator is physically disconnectable from the calibration controller.

Another inventive aspect is a method of using a voltage regulator including a first clock generator circuit, N phase extrapolator circuits, and a phase selector multiplexer. The method includes, with the first clock generator circuit, receiving a reference clock signal, and with the first clock generator circuit, generating M first clock signals based on the reference clock signal, where the M first clock signals are phase separated by about 360°/M, where N is not equal to M. The method also includes, with the phase selector multiplexer, transmitting a respective M first clock signal to each of the respective N phase extrapolator circuits, and with each phase extrapolator circuit of the N phase extrapolator circuits, generating a respective one of N output clock signals based in part on the received particular one first clock signal, where the N output clock signals are phase separated by 360°/N.

In some embodiments, the particular one output clock has a phase difference relative to the received particular one first clock, and phase differences of the N output clocks are controlled so that the N output clocks are phase separated by 360°/N.

In some embodiments, the multiphase switching voltage regulator further includes a phase extrapolator controller, and the method further includes, with the phase extrapolator controller, changing N.

In some embodiments, each of the N phase extrapolator circuits includes a ramp generator circuit and a comparator circuit, where the method further includes, with the ramp generator circuit, receiving one of the M first clock signals, with the ramp generator circuit, generating a ramp signal in response to the received first clock signal, with the comparator circuit, comparing the ramp signal to a programmable reference, and with the comparator circuit, generating one of the N output clock signals based on the comparison, where the generated one output clock signal has a phase difference with respect to a phase of the received first clock signal which is dependent on a value of the programmable reference.

In some embodiments, the ramp signal changes monotonically, where the programmable reference has a minimum value and has a maximum value, and where a time difference between the ramp signal having a value corresponding with the programmable reference having a minimum value and the ramp signal having a value corresponding with the programmable reference having a maximum value is calibrated.

In some embodiments, the reference clock signal has a period, and where the time difference is about equal to about ¼ of the period of the reference clock signal.

In some embodiments, the ramp signal changes monotonically with a rate of change determined by a calibration signal.

In some embodiments, the calibration signal is determined by a calibration controller, and the multiphase switching voltage regulator is physically disconnectable from the calibration controller.

DETAILED DESCRIPTION OF THE INVENTION

Particular embodiments of the invention are illustrated herein in conjunction with the drawings. Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein. For example, certain aspects and principles are discussed with reference to a buck switching power converter. However, as understood by those of ordinary skill in the art, the various aspects and principles may be used in embodiments of other types of switching power converters, such as resonant, boost, buck-boost, and flyback regulators. Furthermore, as understood by those of ordinary skill in the art, while the various aspects and principles are discussed herein with reference to use of a pulse width modulation (PWM) controller, other controllers and control schemes are used in alternative embodiments. In addition, in the embodiments discussed below, MOSFETs are used. However, in some embodiments other transistors or other switches are used.

Figure 1:
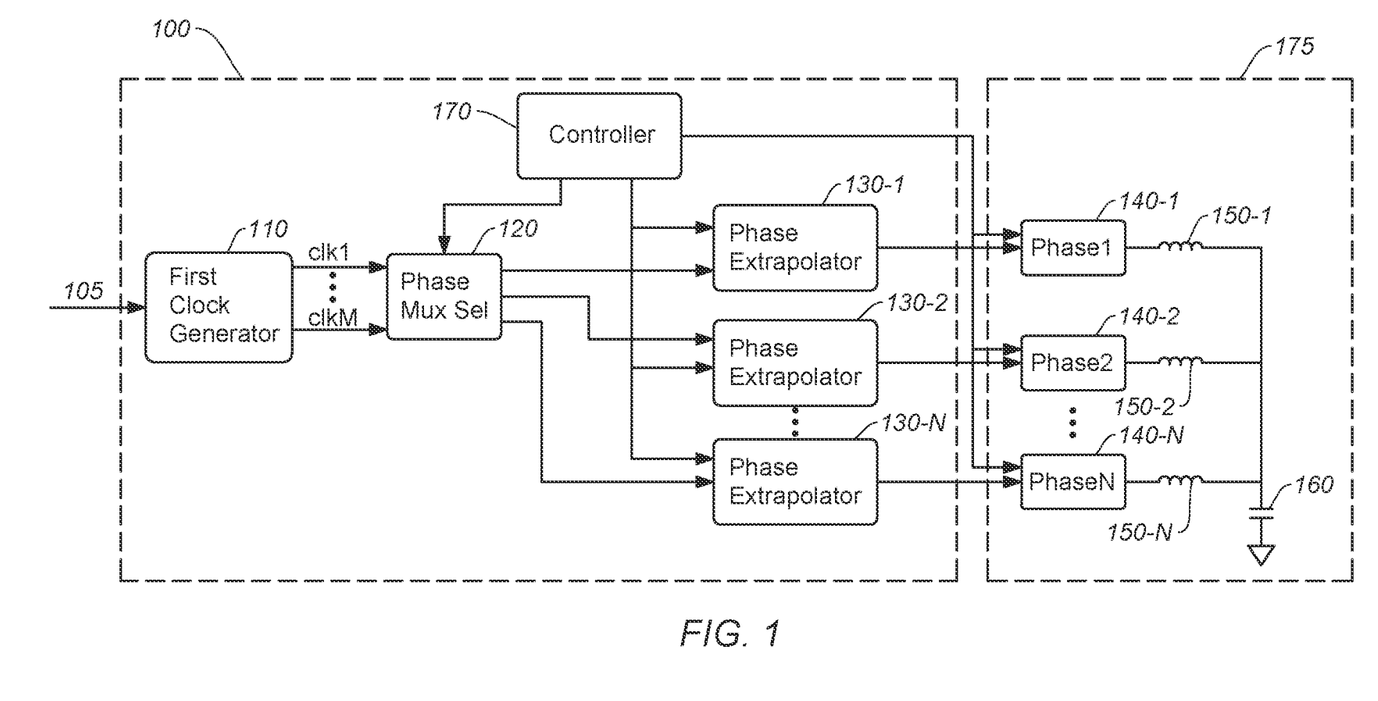
FIG. 1 is a schematic illustration of a multiphase clock generation circuit according to an embodiment generating and providing a multiphase clock to a switching voltage regulator circuit according to an embodiment of the disclosure.
Figure 2:
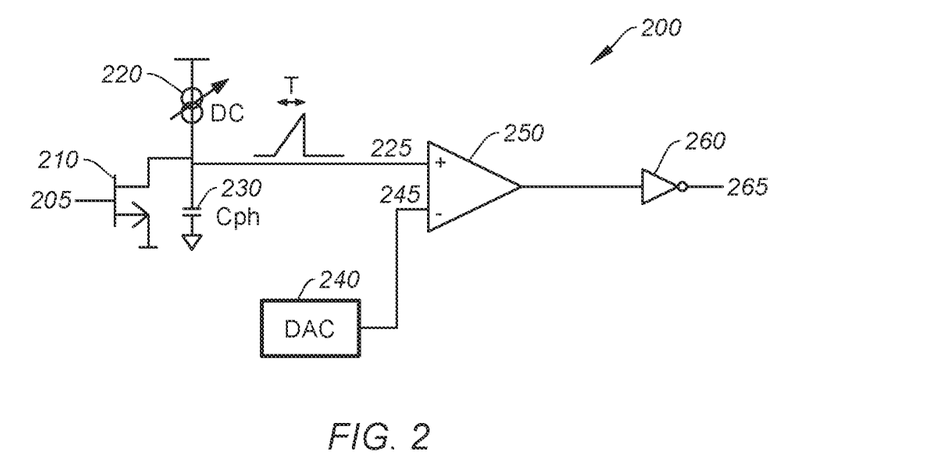
FIG. 2 is a schematic illustration of a phase extrapolator circuit which may be used in the multiphase clock generation circuit of FIG. 1.
Figure 3:
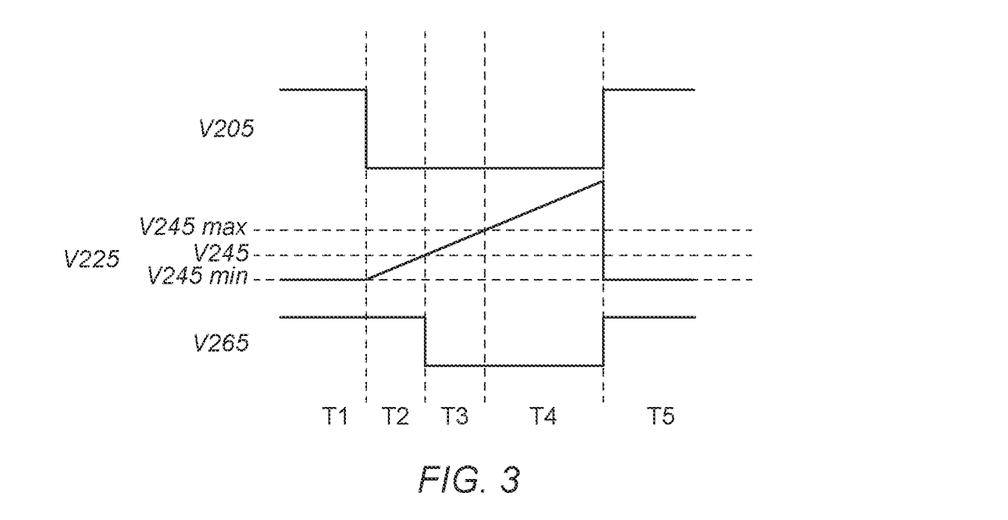
FIG. 3 is a waveform diagram illustrating operation of the phase extrapolator circuit of FIG. 2.
Figure 4:
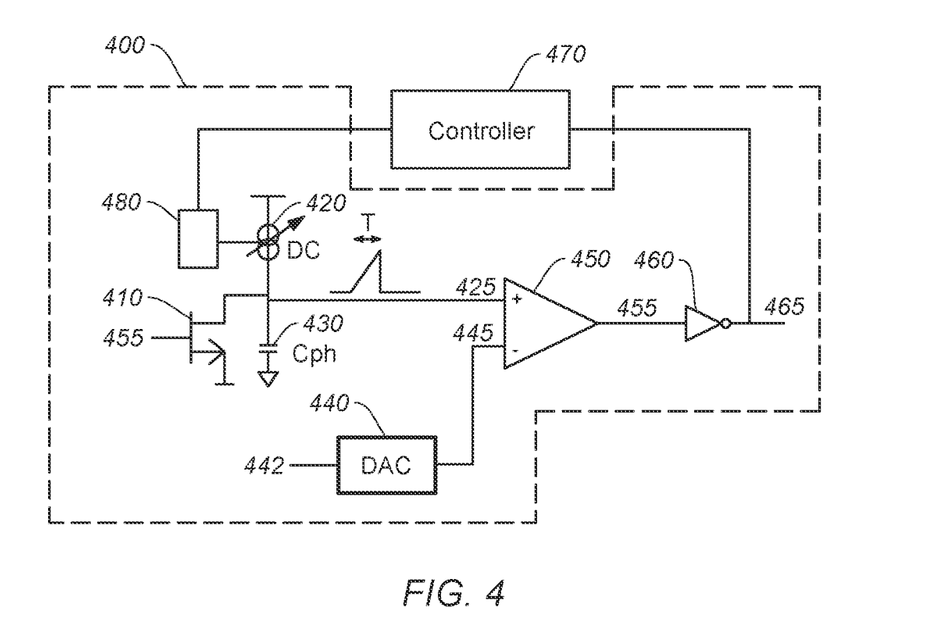
FIG. 4 is a schematic illustration of the phase extrapolator circuit of FIG. 2 during a first type of calibration.
Figure 5:
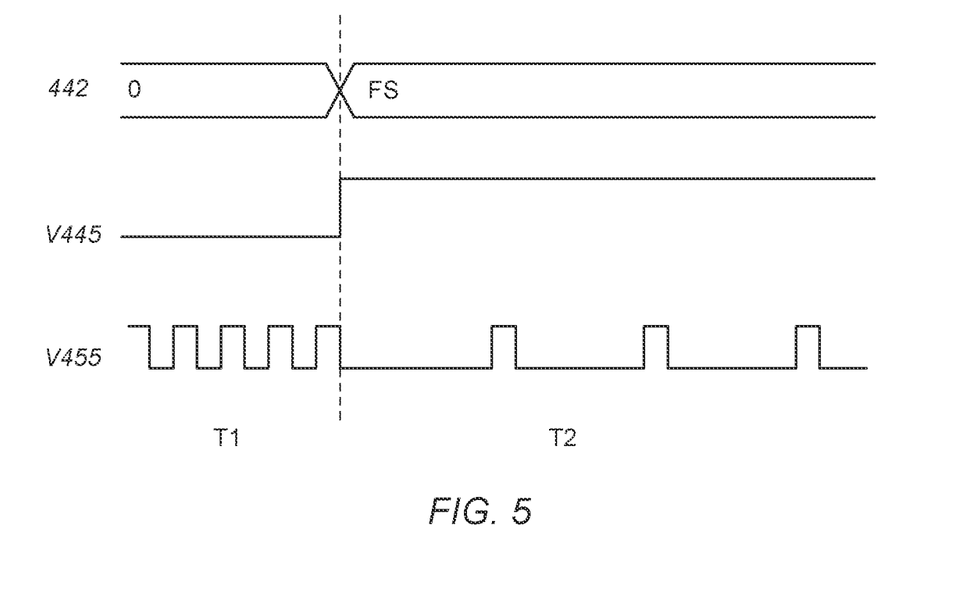
FIG. 5 is a waveform diagram illustrating operation of the phase extrapolator circuit of FIG. 2 during the first type of calibration.
Figure 6:
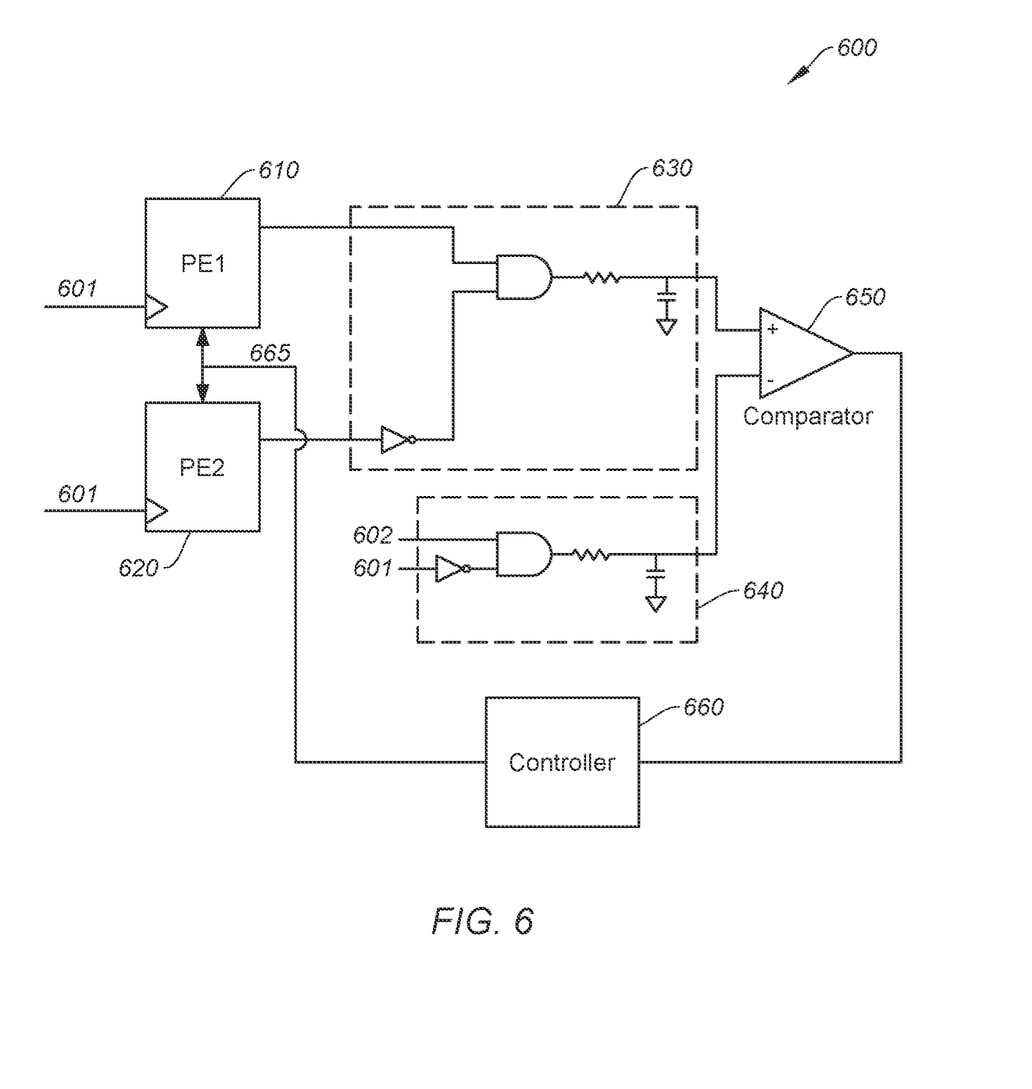
FIG. 6 is a schematic illustration of a phase extrapolator circuit used for a second type of calibration.

Embodiments of multiphase clock generation circuits and phase extrapolator circuits are discussed. The described embodiments provide examples of multiphase clock generation circuits and phase extrapolator circuits that have improved accuracy as compared to traditional clock circuits. The described embodiments also enable power regulation circuits that generate minimal ripple. FIG. 1 illustrates a switching voltage regulator circuit using a multiphase clock generated by a clock generation circuit. FIGS. 2 and 3 illustrate a phase extrapolator circuit and its operation. FIGS. 4-6 illustrate methods for calibrating the phase extrapolator circuit.

FIG. 1 is a schematic illustration of a multiphase clock generation circuit 100 that provides a multiphase clock to a switching voltage regulator circuit 175, according to an embodiment of the disclosure. Multiphase clock generation circuit 100 includes first clock generator circuit 110, phase selector multiplexer 120, phase extrapolator circuits 130-1 to 130-N, and controller 170.

In the illustrated embodiment, multiphase clock generation circuit 100 includes N phase extrapolator circuits 130-1 to 130-N, where each of the N phase extrapolator circuits is configured to generate one of N clocks. As understood by those of skill in the art, each of the N clocks is offset in phase by 360/N degrees from the other clocks nearest thereto.

First clock generator circuit 110 receives a reference clock at input 105 having a particular frequency. Based on the reference clock, first clock generator circuit 110 generates a fixed number (M) of clocks that are each phase offset by 360/M degrees. First clock generator circuit 110 may comprise any phase separated or multiphase clock generation circuit. For example, in some embodiments, first clock generator circuit 110 includes one or more of a phase locked loop (PLL), a free running inverter based oscillator, or an LC tank based oscillator.

The M clocks generated by first clock generator circuit 110 are provided to phase selector multiplexer 120, which selects one of the M clocks generated by first clock generator circuit 110 for each of the phase extrapolator circuits 130-1 to 130-N based on signals from controller 170. The specific M clock signal received by each respective phase extrapolator circuit 130-1 to 130-N is determined based on the number M and the total number (N) of clock phases to be generated by the phase extrapolator circuits 130-1 to 130-N.

In some embodiments, phase selector multiplexer 120 comprises N multiplexor circuits, each having an output connected to one of the N phase extrapolator circuits 130-1 to 130-N. Phase selector multiplexer 120 can also have M inputs, where each input is configured to receive one of the M clock signals generated by the first clock generator circuit 110. Each of the N multiplexor circuits receives control inputs from the controller 170 which determines which of the M clock signals generated by the first clock generator circuit 110 is provided to the particular phase extrapolator circuit 130-1 to 130-N connected thereto.

For example, in some embodiments, each particular one of the N phase extrapolator circuits 130-1 to 130-N receives one of the M clock signals generated by the first clock generator circuit 110, where the one of the M clock signals received by each particular phase extrapolator circuit 130-1 to 130-N is the one of the M clock signals that has a phase value which is closest to the phase to be generated by the respective extrapolator circuit 130-1 to 130-N.

For example, in some embodiments, first clock generator circuit 110 may be configured to generate 4 clocks, phase separated by 90°, and 5 phase extrapolator circuits 130-1 to 130-5 may be configured to generate 5 clocks, phase separated by 72°. A first of the 5 phase extrapolator circuits 130-1, configured to generate a 0° clock, may receive a first of the 4 clocks, where the first of the 4 clocks has a phase of 0°. The first phase extrapolator circuit 130-1 generates the 0° phase shifted clock based on the received 0° phase second first clock. In addition, a second of the 5 phase extrapolator circuits 130-2, configured to generate a 72° phase shifted clock, may receive the first of the 4 clocks, where the first of the 4 clocks has a phase of 0°. The second phase extrapolator circuit 130-2 generates the 72° phase shifted clock by adding 72° of phase to the 0° phase clock received from the first clock generator circuit 110.

In addition, a third of the 5 phase extrapolator circuits 130-3, configured to generate a 144° phase shifted clock, may receive a second of the 4 clocks, where the second of the 4 clocks has a phase of 90°. The third phase extrapolator circuit 130-3 generates the 144° phase shifted clock by adding 54° of phase to the 90° phase second clock received from the first clock generator circuit 110. In addition, a fourth of the 5 phase extrapolator circuits 130-4, configured to generate a 216° phase shifted clock, may receive a third of the 4 clocks, where the third of the 4 clocks has a phase of 180°. The fourth phase extrapolator circuit 130-4 generates the 216° phase shifted clock by adding 36° of phase to the 180° phase first clock received from the first clock generator circuit 110. In addition, a fifth of the 5 phase extrapolator circuits 130-5, configured to generate a 288° phase shifted clock, may receive a fourth of the 4 clocks, where the fourth of the 4 clocks has a phase of 270°. The fifth phase extrapolator circuit 130-5 generates the 288° phase shifted clock by adding 18° of phase to the 270° phase fourth clock received from the first clock generator circuit 110.

Each of the N phase extrapolator circuits 130-1 to 130-N generates an output clock having a particular phase. Each of the N clocks is offset in phase by 360/N degrees from the two other clocks nearest thereto in phase. To generate the output clock having the particular phase, each particular phase extrapolator circuit 130-1 to 130-N receives one of the M first clocks of the first clock generator circuit 110, and generates an output clock signal delayed by a programmable delay time, where the programmable delay time corresponds with the difference in phase between the received first clock and the generated output clock.

In the example discussed above, first clock generator circuit 110 is configured to generate 4 clock signals, phase separated by 90°, and 5 phase extrapolator circuits 130-1 to 130-5 are configured to generate 5 clock signals, phase separated by 72°. The first of the 5 extrapolator circuits 130-1, configured to generate a 0° clock signal, receives a first of the 4 clock signals generated by the first clock generator circuit 110, where the first of the 4 first clock signals has a phase of 0°. In addition, the first extrapolator circuit generates an output clock signal delayed by 0 delay time, such that the first extrapolator circuit generates an output clock signal having a phase of 0°. In some embodiments, the first extrapolator circuit generates an output clock signal delayed by a particular non-zero delay time and having a phase of 0°.

The second of the 5 extrapolator circuits 130-2, configured to generate a 720 phase shifted clock signal, also receives the first of the 4 clock signals generated by the first clock generator circuit 110, where the first of the 4 clock signals has a phase of 0°. In addition, the second extrapolator circuit generates an output clock signal delayed by a delay time corresponding with 72°, such that the second extrapolator circuit generates an output clock signal having a phase of 72°. In some embodiments, the second extrapolator circuit generates an output clock signal delayed by a delay time corresponding with 72° plus the particular non-zero delay time.

In addition, the third of the 5 extrapolator circuits 130-3, configured to generate a 1440 phase shifted clock signal, receives the a second of the 4 clock signals generated by the first clock generator circuit 110, where the second of the 4 first clock signals has a phase of 90°. In addition, the third extrapolator circuit generates an output clock signal delayed by a delay time corresponding with 1440-90°, such that the second extrapolator circuit generates an output clock signal having a phase of 144°. In some embodiments, the third extrapolator circuit generates an output clock signal delayed by a delay time corresponding with 144°-90° plus the particular non-zero delay time.

In addition, the fourth of the 5 extrapolator circuits 130-4, configured to generate a 216° phase shifted clock signal, receives a third of the 4 clock signals generated by the first clock generator circuit 110, where the third of the 4 first clock signals has a phase of 180°. In addition, the fourth extrapolator circuit generates an output clock signal delayed by a delay time corresponding with 216°-180°, such that the second extrapolator circuit generates an output clock signal having a phase of 180°. In some embodiments, the fourth extrapolator circuit generates an output clock signal delayed by a delay time corresponding with 216°-180° plus the particular non-zero delay time.

Finally, the fifth of the 5 extrapolator circuits 130-5, configured to generate a 288° phase shifted clock signal, receives a fourth of the 4 clock signals generated by the first clock generator circuit 110, where the fourth of the 4 first clock signals has a phase of 270°. In addition, the fifth extrapolator circuit generates an output clock signal delayed by a delay time corresponding with 288°-270°, such that the second extrapolator circuit generates an output clock signal having a phase of 288°. In some embodiments, the fifth extrapolator circuit generates an output clock signal delayed by a delay time corresponding with 288°-270° plus the particular non-zero delay time.

In some embodiments, N is greater than M. In some embodiments, N is equal to M. In some embodiments, N is less than M. Switching voltage regulator circuit 175 includes phase circuits 140-1 to 140-N, inductors 150-1 to 150-N, and output capacitor 160.

Phase circuits 140-1 to 140-N may each include one or more solid-state switches that deliver power from a power source through inductors 150-1 to 150-N to a load (not shown) connected to output capacitor 160. In various embodiments, each phase circuit 140-1 to 140-N may include an arrangement of serially coupled solid-state switches, and in other embodiments, each phase circuit 140-1 to 140-N may include a pair of solid-state switches arranged, for example, in a synchronous buck converter topology, while in yet other embodiments, each phase circuit 140-1 to 140-N may include, for example, a full-bridge, a boost, a buck-boost, a flyback, or other type of power regulator circuit. Other suitable power delivery circuits may be used as the phase circuits 140-1 to 140-N.

Each phase circuit 140-1 to 140-N receives an output clock signal from one of the phase extrapolator circuits 130-1 to 130-N. In response to the received output clocks, each of the phase circuits delivers power or current through the inductors 150-1 to 150-N connected thereto to the load connected to output capacitor 160. Because the phases of the output clocks are offset by 360/N, during each period of the reference clock, each particular phase circuit of the N phase circuits delivers power or current to the load once, as controlled by the output clock signal from the phase extrapolator circuit 130-1 to 130-N connected thereto.

In some embodiments, the total number (N) of clock phases to be generated is programmable, and may be changed during operation of the multiphase clock generation circuit 100, for example by controller 170. For example, the controller 170 may reduce the number of clock phases to be generated to N-x by providing appropriate signals to the phase selector multiplexer 120, where the signals indicate the reduced number (N-x) of clock phases to be generated.

In response to receiving the signals indicating that N-x clock phases are to be generated, the phase selector multiplexer 120 is configured to select one of the M clocks generated by first clock generator circuit 110 for each of the N-x phase extrapolator circuits 130-1 to 130-N to be used, according to clock selection algorithms discussed elsewhere herein.

In some embodiments, phase selector multiplexer 120 or the controller 170 is configured to send one or more signals to the x phase extrapolator circuits 130-1 to 130-N not generating clock phases to cause the unused phase extrapolator circuits 132 to power down or to otherwise not deliver power or current to the load through inductors 150-1 to 150-N. In some embodiments, phase selector multiplexer 120, the unused phase extrapolator circuits 130-1 to 130-N, or the controller 170 additionally or alternatively sends control signals to the unused phase circuits 140-1 to 140-N, causing the unused phase circuits 140-1 to 140-N to power down or to otherwise not deliver power or current to the load through inductors 150-1 to 150-N.

FIG. 2 is a schematic illustration of a phase extrapolator circuit 200 that may be used in the multiphase clock generation circuit 100 of FIG. 1. Phase extrapolator circuit 200 may be used in other suitable clock generation circuits. Multiphase clock generation circuit 100 may use other embodiments of phase extrapolator circuits. Phase extrapolator circuit 200 includes switch 210, current source 220, capacitor 230, digital to analog converter (DAC) 240, comparator 250, and inverter 260.

FIG. 3 is a waveform diagram illustrating operation of the phase extrapolator circuit 200 of FIG. 2. FIG. 3 illustrates an input clock signal V205 at input 205, a voltage V225 at node 225, an analog voltage V245 at node 245, and an output voltage V265 at node 265. The switch 210 receives, as the input clock at input 205, one of the M clocks generated by first clock generator circuit 110 from the phase selector multiplexer 120, as described above. In addition, the DAC 240 receives a digital input code from, for example, the controller 170, and generates a corresponding analog voltage V245 at node 245.

During time T1, the input clock, being high, causes switch 210 to be conductive. Because switch 210 is conductive, the voltage V225 at node 225 is equal or substantially equal to 0 or the ground voltage. In addition, during time T1, because the voltage V225 at node 225 is less than the voltage V245 at node 245, the comparator 250 and the inverter 260 collectively cause the voltage V265 at output 265 to be high.

During time T2, the input clock, being low, causes switch 210 to be nonconductive. Because switch 210 is nonconductive, current source 220 provides charge to capacitor 230, and the voltage V225 at node 225 begins to increase. Because the current of current source 220 is constant or substantially constant, the increase in the voltage V225 at node 225 is linear or substantially linear.

As discussed in further detail below, the current of the current source 220 is calibrated such that the voltage V225 at node 225 increases at a calibrated rate. The calibrated rate causes the time difference between a first voltage V225 at node 225 being equal or substantially equal to the minimum output of DAC 240 and a second voltage V225 at node 225 being equal or substantially equal to the maximum output of DAC 240 to be equal or substantially equal to ¼ of the period of the input clock. In addition, during time T2, because the voltage V225 at node 225 is less than the voltage V245 at node 245, the comparator 250 and the inverter 260 collectively cause the voltage at output node 265 to be high.

During time T3, the input clock, continuing to be low, causes switch 210 to continue to be nonconductive. Because switch 210 is nonconductive, current source 220 provides charge to capacitor 230, and the voltage V225 at node 225 continues to increase. Because the current of current source 220 is constant or substantially constant, the increase in the voltage V225 at node 225 continues to be linear or substantially linear. In addition, during time T3, because the voltage V225 at node 225 has become greater than the voltage V245 at node 245, the comparator 250 and the inverter 260 collectively cause the voltage V265 at output node 265 to be low.

At the end of time T3, the voltage V225 at node 225 crosses the voltage level of the maximum output of the DAC 240. As discussed above, the calibrated rate of the voltage increase at node 225 causes the time difference between the voltage V225 at node 225 being equal or substantially equal to the minimum output of DAC 240 and the voltage V225 at node 225 being equal or substantially equal to the maximum output of DAC 240 to be equal or substantially equal to ¼ of the period of the input clock. Accordingly, the time at the end of time T3 corresponds with a phase delay of ¼ of the period of the input clock with respect to the time the voltage V225 at node 225 being equal or substantially equal to the minimum output of DAC 240.

The time at the beginning of time T3 corresponds with a phase delay of a programmed portion of the period of the input clock with respect to the time the voltage V225 at node 225 being equal or substantially equal to the minimum output of DAC 240, where the programmed portion is defined by the digital input code of the DAC 240 received, for example, from the controller 170. For example, if the digital input code of DAC 240 is 0, the minimum digital input code, the time at the beginning of time T3 corresponds with no phase delay. Similarly, if the digital input code of DAC 240 is full scale, the maximum digital input code, the time at the beginning of time T3 corresponds with maximum phase delay, which is ¼ of the period of the input clock, and the time at the beginning of time T3 coincides with the time at the beginning of time T4.

During time T4, the input clock, continuing to be low, causes switch 210 to be nonconductive. Because switch 210 is nonconductive, current source 220 provides charge to capacitor 230, and the voltage V225 at node 225 continues to increase. Because the current of current source 220 is constant or substantially constant, the increase in the voltage V225 at node 225 continues to be linear or substantially linear. In addition, during time T4, because the voltage V225 at node 225 is greater than the voltage V245 at node 245, the comparator 250 and the inverter 260 continue to collectively cause the voltage V265 at output node 265 to be low.

During time T5, the input clock, having become high, causes switch 210 to be conductive. Because switch 210 is conductive, the voltage V225 at node 225 becomes equal or substantially equal to 0 or the ground voltage, similar to the operation during time T1. In addition, during time T5, because the voltage V225 at node 225 has become less than the voltage V245 at node 245, the comparator 250 and the inverter 260 collectively cause the voltage V265 at output node 265 to be high, similar to the operation during time T1.

FIG. 4 is a schematic illustration of a phase extrapolator circuit 400 during a first type of calibration, according to an embodiment of the disclosure. Phase extrapolator circuit 400 may have features similar or identical to Phase extrapolator circuit 200 of FIG. 2. Phase extrapolator circuit 400 includes switch 410, current source 420, capacitor 430, digital to analog converter (DAC) 440, comparator 450, inverter 460, and trim block 480.

As illustrated, phase extrapolator circuit 400 is electrically connected with controller 470. In some embodiments, phase extrapolator circuit 400 is physically disconnectable from controller 470. For example, controller 470 may be implemented using a programmable automatic test equipment (ATE) machine. In some embodiments, controller 470 may be part of controller 170. Switch 410, current source 420, capacitor 430, digital to analog converter (DAC) 440, and comparator 450 cooperatively function similarly or identically to the corresponding components of phase extrapolator circuit 400 described above with reference to FIGS. 2 and 3.

Trim block 480 generates a current control output for current source 420 based on a current control input signal from controller 470. Current source 420 is configured to generate a current having a value corresponding with the current control output from trim block 480. Accordingly, controller 470 is configured to control the value of the current generated by current source 420 by generating the current control input signal for trim block 480.

As shown, the output of comparator 450 at node 455 is used as the input clock signal for switch 410. Accordingly, phase extrapolator circuit 400 operates as an oscillator. A portion of the period of oscillation is determined by the time required for the voltage at node 425 increase from 0 or the ground voltage to the voltage V445 at node 445. Accordingly, the voltage V445 at node 445 controls the frequency of oscillation. Therefore, the digital input code to DAC 440, from, for example, a controller, controls the frequency of oscillation.

FIG. 5 is a waveform diagram illustrating operation of the phase extrapolator circuit 400 during the first type of calibration. FIG. 5 illustrates the input code 442 of DAC 440, the voltage V445 at node 445, and the voltage V455 at node 455. During time T1, the input code of DAC 440 is set to the minimum value. Accordingly, during time T1, the voltage V445 at node 445 is the minimum analog output voltage of DAC 440. Consequently, the frequency at node 455 is at the maximum of the frequency range which is controlled by the input code of DAC 440, and corresponds with the propagation delays of the comparator 450 and the ramp generation circuitry, and corresponds with minimum input code of DAC 440.

During time T2, the input code of DAC 440 is set to the maximum of full scale value. Accordingly, during time T2, the voltage at node 445 is the maximum analog output voltage of DAC 440. Consequently, the frequency at node 455 is at the minimum of the frequency range which is controlled by the input code of DAC 440, and corresponds with the propagation delays of the comparator 450 and the ramp generation circuitry, and corresponds with the maximum input code of DAC 440.

Controller 470 is configured to measure or calculate a difference between a period of the clock signal at output node 465 during time T1 and a period of the clock signal at output node 465 during time T2. In addition, controller 470 is configured to access or receive one or more signals indicating a target time value for the difference between the period of the clock signal at output node 465 during time T1 and the period of the clock signal at output node 465 during time T2.

Furthermore, controller 470 is configured to program trim block 480 by providing the current control input to trim block 480, where the controller determines the current control input based on a difference between the target time value and the calculated value for the difference between the period of the clock signal at output node 465 during time T1 and the period of the clock signal at output node 465 during time T2. Additionally, controller 470 is configured to program trim block 480 by providing a current control input signal to trim block 480 which minimizes the difference between the target time value and the calculated value for the difference between the period of the clock signal at output node 465 during time T1 and the period of the clock signal at output node 465 during time T2, according to a feedback loop mechanism, as understood by those of skill in the art.

Trim block 480 comprises a memory configured to store the current control input so as to generate a persistent current control output for current source 420. For example, trim block 480 may comprise an EEPROM, a number of selectively trimmable resistors, and/or a number of fuses, which may be selectively blown so as to permanently program trim block 480. Accordingly, trim block 480 may be configured to generate a persistent current control output for current source 420 while controller 470 is disconnected from phase extrapolator circuit 400.

In some embodiments of the multiphase clock generation circuit 100, each phase extrapolator circuit 130-1 to 130-N comprises a trim block that is programmed by a controller during a calibration process, such as that described above with reference to FIG. 4, and the trim block of each phase extrapolator circuit 130-1 to 130-N controls the current of the current source thereof. In some embodiments, a single calibration phase extrapolator circuit is used to program a single trim block, and the single trim block controls the current of the current source of multiple phase extrapolator circuits.

FIG. 6 is a schematic illustration of a calibration circuit 600 used for a second type of phase extrapolator circuit calibration, according to embodiments of the disclosure. Calibration circuit 600 includes first and second phase extrapolator circuits 610 and 620, first and second phase to voltage converters 630 and 640, comparator 650, and controller 660. In some embodiments, controller 660 may be part of controller 170. The DAC input code for first phase extrapolator circuit 610 is set to full scale, and the DAC input code for second phase extrapolator circuit 620 is set to 0 or minimum value. In addition, the first phase to voltage converter 630 receives outputs of the first and second phase extrapolator circuits 610 and 620.

Accordingly, during each clock period of the input clock at input node 601, during the time between the second phase extrapolator circuit 620 output going low and the first phase extrapolator circuit 610 output going low, the AND gate output of the first phase to voltage converter 630 is high. This time is equal to the duration between the time the voltage of node 225 of the second phase extrapolator circuit 620 increases to the minimum DAC output voltage of the second phase extrapolator circuit 620 and the time the voltage of node 225 of the first phase extrapolator circuit 610 increases to the maximum DAC output voltage of the first phase extrapolator circuit 610. The RC filter of the first phase to voltage converter 630 generates an output voltage which is approximately the average of the output of the AND gate of the first phase to voltage converter 630.

In addition, the second phase to voltage converter 640 receives the input clock at input node 601 and the input clock at input node 602, where input clock at input node 602 is phase delayed from input clock at input node 601 by 90°. Accordingly, during the time between the input clock at input node 602 going low and the input clock at input node 601 going low, the AND gate output of the second phase to voltage converter 640 is high. This time is equal to the duration of substantially or about ¼ of the clock period of input clock at input node 601. The RC filter of the second phase to voltage converter 640 generates an output voltage which is approximately the average of the output of the AND gate of the second phase to voltage converter 630.

Comparator 650 receives the outputs of the first and second phase to voltage converters 630 and 640 and generates a comparison output for controller 660 which indicates whether the time between the second phase extrapolator circuit 620 output going low and the first phase extrapolator circuit 610 output going low is greater or less than ¼ of the clock period of input clock at input node 601. In response to the comparison output indicating that the time between the second phase extrapolator circuit 620 output going low and the first phase extrapolator circuit 610 output going low is greater than ¼ of the clock period of input clock at input node 601, the controller 660 changes the current control signal at node 665 so as to cause the current sources of the first and second phase extrapolator circuits 610 and 620 to increase. Similarly, in response to the comparison output indicating that the time between the second phase extrapolator circuit 620 output going low and the first phase extrapolator circuit 610 output going low is less than ¼ of the clock period of input clock at input node 601, the controller 660 changes the current control signal at node 665 so as to cause the current sources of the first and second phase extrapolator circuits 610 and 620 to decrease.

Furthermore, controller 620 is configured to generate the signal at node 665 which minimizes the difference between the time between the second phase extrapolator circuit 620 output going low and the first phase extrapolator circuit 610 output going low and ¼ of the clock period of input clock at input node 601, according to a feedback loop mechanism, as understood by those of skill in the art.

One or more trim blocks of the phase extrapolator circuits 130-1 to 130-N may be programmed according to the signal at node 665 to cause the current sources of the phase extrapolator circuits 130-1 to 130-N to provide the current needed for the rate of the voltage increase at node 225 to be such that the time difference between the voltage V225 at node 225 being equal or substantially equal to the minimum output of DAC 240 and the voltage V225 at node 225 being equal or substantially equal to the maximum output of DAC 240 to be equal or substantially equal to ¼ of the period of the input clock. In some embodiments, first and second phase extrapolator circuits 610 and 620 are physically disconnectable from controller 660. For example, controller 660 may be implemented using a programmable automatic test equipment (ATE) machine. In some embodiments, controller 660 may be part of controller 170.

In some embodiments, first and second phase extrapolator circuits 610 and 620 are physically disconnectable from first and second phase to voltage converters 630 and 640, and comparator 650. For example, first and second phase to voltage converters 630 and 640, and comparator 650 may be implemented on a test board, to which first and second phase extrapolator circuits 610 and 620 may be selectably connected so as to electrically connect first and second phase extrapolator circuits 610 and 620 to the programmable automatic test equipment (ATE) machine.

In some embodiments, first and second phase extrapolator circuits 610 and 620 are selected first and second phase extrapolator circuits of phase extrapolator circuits 130-1 to 130-N. In some embodiments, first and second phase extrapolator circuits 610 and 620 are integrated with and are distinct from phase extrapolator circuits 130-1 to 130-N.

As understood by those of skill in the art, actual phase differences between clocks has a precision related to circuit and parasitic variations and mismatches in actual circuit implementations. The clocks discussed herein may be understood as having conceptual titles of precise phase values or as having functionality of the precise phase values to distinguish each clock from the other clocks, as opposed to having the actual precise phase values indicated, as understood by those of skill in the art.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A voltage regulator, comprising:
   a first clock generator circuit configured to receive a reference clock signal, and to generate M first clock signals, wherein each of the M first clock signals are phase separated by 360°/M;
   N phase extrapolator circuits, wherein N is not equal to M; and
   a phase selector multiplexer configured to provide one of the M first clock signals to each of the N phase extrapolator circuits;
   wherein the N phase extrapolator circuits are configured to generate N output clock signals based in part on the M first clock signals received from the phase selector multiplexer, wherein each of the N output clock signals are phase separated by 360°/N;
   wherein each of the N phase extrapolator circuits comprises:
   a ramp generator circuit configured to receive one of the M first clock signals and to generate a ramp signal in response to the received first clock signal; and
   a comparator circuit configured to compare the ramp signal to a programmable reference and to generate one of the N output clock signals based on the comparison, wherein the generated one output clock signal has a phase difference with respect to a phase of the received first clock signal which is dependent on a value of the programmable reference.

2. The voltage regulator of claim 1, wherein each phase extrapolator circuit of the N phase extrapolator circuits is configured to receive a particular one of the M first clock signals, and to generate a corresponding one of the N output clock signals, wherein the particular one of the N output clock signals has a phase difference relative to the received particular one first clock signal, and wherein the phase differences of the N output clock signals are controlled so that the N output clock signals are phase separated by 360°/N.

3. The voltage regulator of claim 1, further comprising a phase extrapolator controller configured to change N output clock signals.

4. The voltage regulator of claim 1, wherein the ramp signal changes monotonically, wherein the programmable reference has a minimum value and has a maximum value, and wherein a time difference between the ramp signal having a value corresponding with the programmable reference having a minimum value and the ramp signal having a value corresponding with the programmable reference having a maximum value is calibrated.

5. The voltage regulator of claim 4, wherein the reference clock signal has a period, and wherein the time difference is about equal to about ¼ of the period of the reference clock signal.

6. The voltage regulator of claim 1, wherein the ramp signal changes monotonically with a rate of change determined by a calibration signal.

7. The voltage regulator of claim 6, wherein the calibration signal is determined by a calibration controller, and wherein the voltage regulator is physically disconnectable from the calibration controller.

8. A voltage regulator, comprising:
a first clock generator circuit configured to receive a reference clock signal, and to generate M first clock signals, wherein each of the M first clock signals are phase separated by 360°/M;
N phase extrapolator circuits; and
a phase selector multiplexer configured to provide one of the M first clock signals to each of the N phase extrapolator circuits;
wherein the N phase extrapolator circuits are configured to generate N output clock signals based in part on the M first clock signals received from the phase selector multiplexer, wherein each of the N output clock signals are phase separated by 360°/N;
wherein each of the N phase extrapolator circuits comprise:
a ramp generator circuit configured to receive one of the M first clock signals and to generate a ramp signal in response to the received first clock signal; and
a comparator circuit configured to compare the ramp signal to a programmable reference and to generate one of the N output clock signals based on the comparison, wherein the generated one output clock signal has a phase difference with respect to a phase of the received first clock signal which is dependent on a value of the programmable reference.

9. The voltage regulator of claim 8, wherein each phase extrapolator circuit of the N phase extrapolator circuits is configured to receive a particular one of the M first clock signals, and to generate a corresponding one of the N output clock signals, wherein the particular one of the N output clock signals has a phase difference relative to the received particular one first clock signal, and wherein the phase differences of the N output clock signals are controlled so that the N output clock signals are phase separated by 360°/N.

10. The voltage regulator of claim 8, further comprising a phase extrapolator controller configured to change N output clock signals.

11. The voltage regulator of claim 8, wherein the ramp signal changes monotonically, wherein the programmable reference has a minimum value and has a maximum value, and wherein a time difference between the ramp signal having a value corresponding with the programmable reference having a minimum value and the ramp signal having a value corresponding with the programmable reference having a maximum value is calibrated.

12. The voltage regulator of claim 11, wherein the reference clock signal has a period, and wherein the time difference is about equal to about of the period of the reference clock signal.

13. The voltage regulator of claim 8, wherein the ramp signal changes monotonically with a rate of change determined by a calibration signal.

14. The voltage regulator of claim 13, wherein the calibration signal is determined by a calibration controller, and wherein the voltage regulator is physically disconnectable from the calibration controller.

15. A method of using a voltage regulator comprising a first clock generator circuit, N phase extrapolator circuits, and a phase selector multiplexer, the method comprising:
with the first clock generator circuit, receiving a reference clock signal;
with the first clock generator circuit, generating M first clock signals based on the reference clock signal, wherein the M first clock signals are phase separated by about 360°/M, wherein N is not equal to M;
with the phase selector multiplexer, transmitting a respective M first clock signal to each of the respective N phase extrapolator circuits; and
with each phase extrapolator circuit of the N phase extrapolator circuits, generating a respective one of N output clock signals based in part on a received particular one first clock signal, wherein N output clock signals are phase separated by 360°/N;
wherein each of the N phase extrapolator circuits comprises a ramp generator circuit and a comparator circuit, wherein the method further comprises:
with the ramp generator circuit, receiving one of the M first clock signals:
with the ramp generator circuit, generating a ramp signal in response to the received first clock signal;
with the comparator circuit, comparing the ramp signal to a programmable reference; and
with the comparator circuit, generating one of the N output clock signals based on the comparison, wherein the generated one output clock signal has a phase difference with respect to a phase of the received first clock signal which is dependent on a value of the programmable reference.

16. The method of claim 15, wherein the generated one output clock has a phase difference relative to the received particular one first clock signal, and wherein phase differences of the N output clock signals are controlled so that the N output clock signals are phase separated by 360°/N.

17. The method of claim 15, wherein the voltage regulator further comprises a phase extrapolator controller, and the method further comprises, with the phase extrapolator controller, changing N output clock signals.

18. The method of claim 15, wherein the ramp signal changes monotonically, wherein the programmable reference has a minimum value and has a maximum value, and wherein a time difference between the ramp signal having a value corresponding with the programmable reference having a minimum value and the ramp signal having a value corresponding with the programmable reference having a maximum value is calibrated.

19. The method of claim 18, wherein the reference clock signal has a period, and wherein the time difference is about equal to about of the period of the reference clock signal.

20. The method of claim 15, wherein the ramp signal changes monotonically with a rate of change determined by a calibration signal.

21. The method of claim 20, wherein the calibration signal is determined by a calibration controller, and wherein the voltage regulator is physically disconnectable from the calibration controller.

* * * * *